United States Patent [19]

Davis et al.

[11] 3,938,321
[45] Feb. 17, 1976

[54] GAS TURBINE CONTROL

[75] Inventors: James L. Davis; Edward L. Lopke, both of Kokomo, Ind.; Louis W. Huellmantel, Warren, Mich.

[73] Assignee: General Motors Corporation, Detroit, Mich.

[22] Filed: Mar. 4, 1974

[21] Appl. No.: 447,847

[52] U.S. Cl. ........ 60/39.25; 60/39.16 R; 60/39.28 R
[51] Int. Cl.² .......................................... F02C 9/02
[58] Field of Search ..... 60/39.25, 39.16 R, 39.28 R, 60/39.03

[56] References Cited
UNITED STATES PATENTS

| | | | |
|---|---|---|---|
| 3,508,395 | 4/1970 | Sebestyen | 60/39.25 |
| 3,521,446 | 7/1970 | Maljanian | 60/39.25 X |
| 3,523,423 | 8/1970 | Young | 60/39.16 R |
| 3,529,419 | 9/1970 | Reed | 60/39.25 X |
| 3,686,860 | 8/1972 | White | 60/39.25 |
| 3,780,527 | 12/1973 | Lewis | 60/39.25 X |
| 3,844,114 | 10/1974 | Nonnenmann | 60/39.25 X |
| 3,858,390 | 1/1975 | Jansen | 60/39.25 X |

*Primary Examiner*—Clarence R. Gordon
*Attorney, Agent, or Firm*—Paul Fitzpatrick

[57] ABSTRACT

A control system for a gas-coupled gas turbine engine particularly directed to control of the setting angle of the power turbine nozzle of the engine and to correlation of the power turbine nozzle setting with fuel supply and with operating parameters of the engine. The control provides for operation of the engine from closed to full open throttle, with closed throttle calling for idle speed of the engine. The initial stage of opening the throttle develops an increasing nozzle reference temperature signal which is matched with a turbine temperature signal to control a servo which varies the setting, and therefore area, of the turbine nozzle. After the initial stage of throttle opening, the reference temperature signal increases with engine speed, which increases in response to an increasing throttle signal. The actual level of the nozzle reference temperature is also a function of engine inlet temperature up to a given level of this temperature. Throttle position generates a speed reference signal which is matched with actual gas generator speed to control fuel supply to the engine. The speed reference signal is coordinated with the nozzle reference temperature signal so that there is a smooth transition from the increasing nozzle reference temperature over the initial range of throttle movement to the increasing engine speed reference signal over the remainder of the travel of the throttle up to or near 100% rated power output signal.

The control also responds to acceleration of the gas generator to vary the nozzle reference signals so as to improve the acceleration characteristics of a vehicle driven by the engine. Acceleration is sensed by comparing compensated turbine inlet temperature with an acceleration reference temperature signal responsive to engine inlet air temperature, which signal is used to limit engine fuel flow during acceleration. Upon occurrence of an engine acceleration above idle, the opening of the turbine nozzle is limited to improve energy division between the gas generator and power turbines. In one embodiment this limitation is maintained during the duration of acceleration; in another the limitation of nozzle opening is progressively relaxed during the acceleration.

The nozzle opening limitation is overridden during starting of the engine and acceleration to idle, specifically by an override responsive to operation of the starter to crank the gas generator.

7 Claims, 7 Drawing Figures

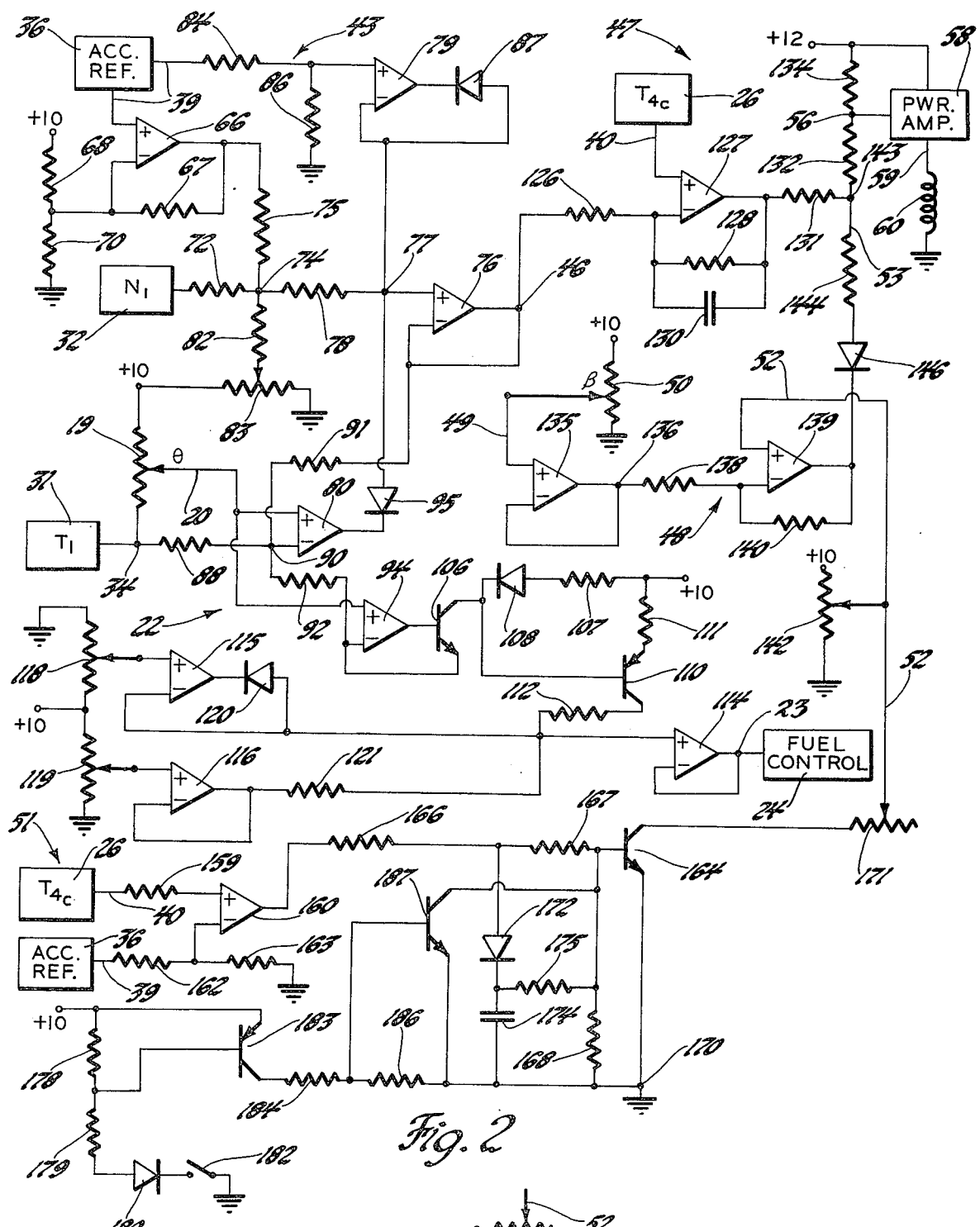
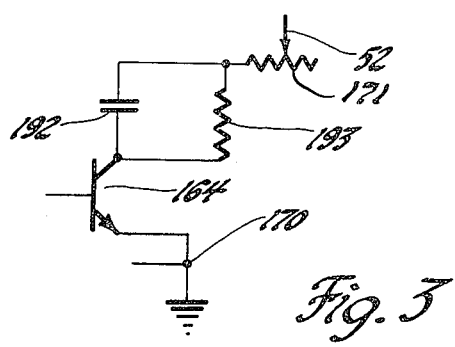
Fig. 2
Fig. 3

GAS TURBINE CONTROL

Our invention relates to controls for gas turbine engines, and particularly to an integrated control for an engine of the gas-coupled type suitable for driving a motor vehicle or similar service. The invention is primarily directed to improved means for varying the setting of turbine nozzle vanes of the power turbine of the engine so as to optimize the operating characteristics of the engine. Also, it is directed to interconnections between the means which generate a signal controlling gas generator speed and the nozzle control signal so as to achieve an increasing engine temperature at constant gas generator speed by closing the nozzle during initial movement of the engine power control or throttle, and thereafter to increase gas generator speed as the power control is further advanced.

Objects of our invention are to improve the control and operating characteristics of gas turbine engines, particularly of engines intended for vehicle service; to provide improved turbine nozzle angle setting controls for a gas turbine engine; to provide improved coordinated fuel and turbine nozzle controls for a gas turbine; and to provide superior electronic controls for a gas turbine engine.

The nature of our invention and its advantages will be clear to those skilled in the art from the succeeding detailed description of the preferred embodiment of the invention and the accompanying drawings thereof.

FIG. 2 is a diagram of electrical circuits of the control system.

FIG. 3 is a partial diagram illustrating a modification of the circuit of FIG. 2.

GENERAL DESCRIPTION

Figure 1:
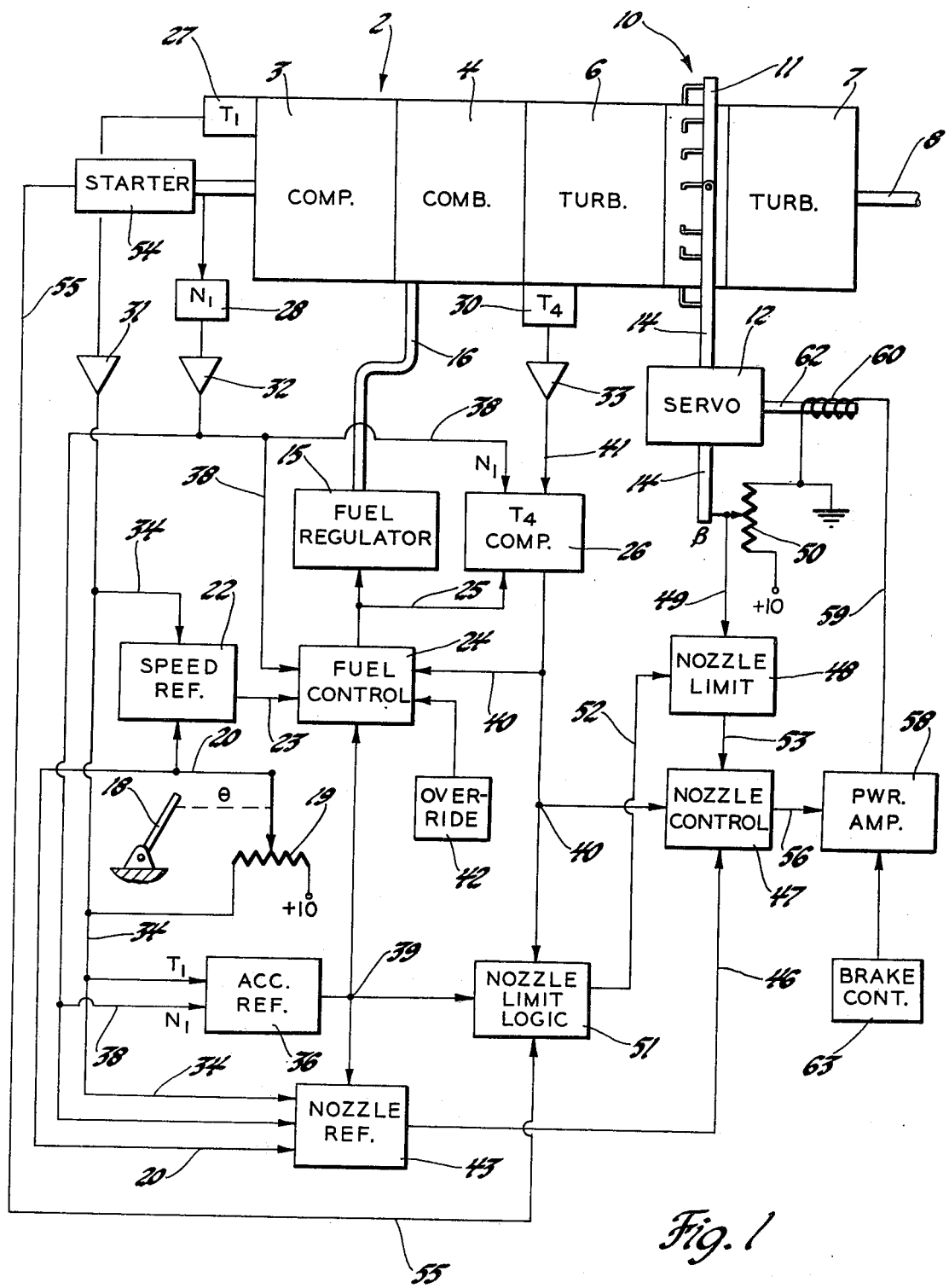
FIG. 1 is a schematic diagram of a gas turbine engine control system.

FIG. 1 provides a basis for a general explanation of the nature of our preferred controls and for the succeeding detailed description of preferred circuits. FIG. 1 illustrates a gas turbine engine 2 which may be of conventional type including a compressor 3, combustion apparatus 4, and a turbine 6. The turbine is connected to drive the compressor, which supplies compressed air to the combustion apparatus where fuel is burned to heat the air, and the resulting combustion products drive the turbine. This part of the engine is called a gas generator. The gas generator supplies motive fluid to a power turbine 7 which drives a power output shaft 8. The power turbine includes a variable nozzle 10 which may be of known type in which the direction of flow of the motive fluid to the power turbine is altered by varying the setting angle of the vanes. Varying the setting angle also varies the area of the nozzle, and thus the division of energy between the turbines 6 and 7. Such nozzle structures are well known, and the nozzle structure may be of any suitable known type. As illustrated, the nozzle includes a unison ring 11 coupled to the vanes which is rotated about the axis of the engine by a servomechanism 12 which reciprocates a rod 14 coupled to the ring 11.

The engine will ordinarily include a regenerator (not illustrated) to heat air flowing from the compressor to the combustion apparatus by heat exchange with the exhaust from turbine 7. This is conventional.

Our invention is largely concerned with the control of the servomechanism 12. It is also concerned with the relation of such control to the supply of fuel to the combustion apparatus of the engine. As illustrated, the fuel is supplied to the combustion apparatus from a fuel regulator 15 through a fuel line 16. The fuel regulator may be any suitable apparatus which responds to a control signal to determine the amount of fuel supplied. It may be a variable displacement pump driven by the engine or otherwise. It may be means for throttling fuel flow from a pump to the engine and by-passing excess fuel back to the pump inlet. There is no need to describe this in detail. One fuel regulator which might be employed is described in U.S. Pat. No. 3,732,039 of Carothers issued May 8, 1973.

Power output level of the engine is set, and acceleration and deceleration are controlled, by a power level control 18 embodied specifically in the common foot throttle or accelerator pedal as is ordinarily employed in motor vehicles. The foot throttle transmits a signal, represented by the character theta, indicative of the degree of movement of the accelerator pedal. This movement is translated by suitable means into a signal adapted to be employed in the electrical control system. Preferably, this is accomplished simply by a potentiometer 19 energized from a constant voltage source of 10 volts. The slider which is coupled to the foot throttle transmits an electrical potential which represents the power demand input setting, which may be referred to as the power level control signal or power signal.

As indicated, this power signal is transmitted over a line 20 to a speed reference signal generating circuit 22 and ultimately through a line 23 to a fuel control circuit 24. The fuel control circuit, in response to this input and other inputs to be described, provides a signal representing required fuel flow on a line 25 to the fuel regulator 15 and to a turbine inlet temperature compensating circuit 26.

Our preferred system responds to three significant parameters of engine operation: namely, engine inlet temperature represented by $T_1$, gas generator speed represented by $N_1$, and turbine inlet temperature represented by $T_4$. The transmitters or transducers for these quantities are represented respectively by 27, 28, and 30. Each of these devices provides an electrical output which is amplified in amplifiers 31, 32, and 33 respectively. The inlet temperature signal from amplifier 31 is transmitted through a line 34 to the speed reference signal generator 22 where it coacts with the power signal from line 20 in determining the magnitude of the speed reference signal through line 23 to the fuel control 24.

Figure 4:
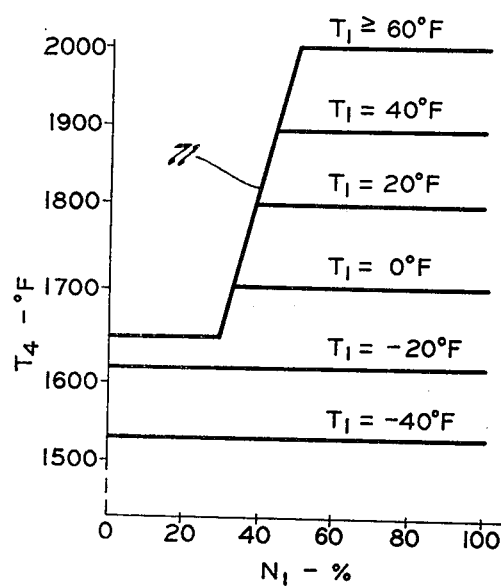
FIG. 4 is a plot illustrating the nature of an acceleration reference temperature signal.

Line 34 also transmits engine inlet temperature to an acceleration reference temperature signal generating circuit 36. The acceleration reference signal is generated in response to the signal of inlet temperature and a signal of gas generator speed transmitted through a line 38 from the amplifier 32. The structure of the acceleration reference signal generator is immaterial to the present invention. It generates an output signal as illustrated in the plot of FIG. 4. This is a modified inlet temperature signal, as will be further explained.

The acceleration reference temperature signal is transmitted through a line 39 to the fuel control where this is compared with a signal representing engine temperature as a means to limit fuel during acceleration. The fuel control also receives an input of gas generator speed from line 38 and an input of compensated turbine inlet temperature from the compensator 26 through a line 40.

The compensated turbine inlet temperature signal is derived from the turbine inlet temperature as measured by thermocouples or other transducers 30 and amplified in the amplifier 33. This is transmitted to the compensator through a $T_4$ line 41. The measured $T_4$ signal is modified so as to be more nearly representative of instantaneous turbine inlet temperature during transients, and further modified to improve the acceleration characteristics of the gas generator. For this reason, the turbine inlet temperature compensating circuit 26 receives inputs of gas generator speed and fuel demand signal in addition to the uncorrected temperature signal. The output of the compensator through line 40 is compared in the fuel control with the acceleration reference temperature limiting signal supplied through line 39 to reduce fuel as necessary to prevent overtemperature during acceleration. In steady state operation, fuel normally is controlled by comparison of gas generator speed with the speed reference signal. The fuel control may receive other inputs such, for example, as inputs of power turbine speed or acceleration from override logic circuits 42 to reduce fuel or shut down the engine in case of threatened power turbine runaway, but such matters are immaterial to the present invention and therefore are not explained here.

At this point, we have described the engine control system except for that portion particularly related to control of the variable nozzle 10. As a matter of general introduction to this subject, a nozzle reference temperature generating circuit 43 receives an input of engine inlet temperature through line 34, an input of gas generator speed through line 38, an input of acceleration reference temperature through line 39, and an input from the power level control through line 20. The circuit 43 transmits through line 46 a temperature limit signal to a nozzle control circuit 47. The variable turbine nozzle is controlled during steady state engine operation by circuit 47, which receives also an input of compensated turbine inlet temperature from line 40. Turbine nozzle opening is limited by a nozzle limit circuit which receives an input representative of turbine nozzle vane angle or setting, beta, through a line 49. The setting signal is taken from a potentiometer 50, energized from the 10 volt circuit, by a slider moved by the rod 14 of the nozzle servo 12, or by any other suitable connection to the turbine nozzle vanes. The potential on line 49 represents the turbine nozzle vane angle and nozzle area.

For improved acceleration of the engine and of the vehicle operated by it, there is also provided a nozzle limit logic circuit 51 which receives an input of compensated turbine inlet temperature from line 40 and an input of acceleration reference temperature signal from line 39. The limit control delivers a correcting signal through a line 52 to the nozzle limit circuit 48. The limit circuit compares the feedback signal on line 49 with the limit signal on line 52, and transmits an overriding signal to the nozzle control circuit through line 53 to limit nozzle area during engine acceleration.

To modify the operation of the nozzle during starting of the engine, the limit logic circuit 51 also is connected through a line 55 to the energizing circuit of a starter 54 which is connected to the gas generator 2 to crank it for starting the engine.

Passing over for the time being the preferred structure and operation of circuits 22, 36, 43, 47, 48, and 51, we may point out that the output of control circuit 47 is transmitted as a control signal through a line 56 to a power amplifier 58 the output of which controls the operation of the servo 12. As illustrated, the power amplifier output is connected through a line 59 and a coil 60 to ground. The coil 60 operates an input 62 to the servomechanism 12. The nature of the servomechanism is immaterial but, for example, it might be a hydraulic servomechanism the direction and extent of movement of which is controlled by movement of, or force exerted on, the input 62.

While it is immaterial to our present invention, it is ordinarily desirable to provide means to brake the power turbine by increasing the angle of the nozzle 10 much beyond the normal operating range so as to reverse the swirl of motive fluid entering the power turbine. As indicated in the schematic diagram, a brake control 63 is connected to the power amplifier. Such a brake control may override the input through line 56 to drive the servo to full travel in the direction to reverse the turbine vanes. It is well known such action may be desired and effected in response to overspeed or unduly high acceleration of the power turbine; or in response to operation of the power turbine above a rather low speed when the throttle 18 is calling for idle engine operation, to provide a measure of braking of the vehicle during coastdown.

Steady-State Nozzle Control

We may now proceed to a description of the preferred electrical circuits of the control, and with this a further explanation of the operation of the control. In connection with the description of the circuits, component types and values are identified for completeness of disclosure and to facilitate practice of the invention. However, it is to be understood that these are subject to variation in response to changing parameters of the engine and developments in the electronic arts, and simply as a matter of choice. The identification of component types and characteristics is therefore not to be considered in any sense as limiting the invention. All operational amplifiers are type S5558V made by Signetics Corporation, and diodes are type DS-31.

Referring to FIG. 2, components and connecting lines identified on FIG. 1 bear the same numbers on FIG. 2.

The nozzle reference temperature generating circuit 43 has an input from the acceleration reference temperature generating circuit 36. The signal line 39 is connected to the plus input of an operational amplifier 66. The output terminal of amplifier 66 is connected through a resistor 67 (10 kilohm) to the minus input, which also is connected to the midpoint of a voltage divider. This voltage divider, energized from the plus 10 volt supply to ground, comprises a 33 kilohm resistor 68 and a 51 kilohm resistor 70. Operational amplifier 66 may be regarded as a follower or scaler, the gain and the DC shift of the amplifier being determined by the resistors 67, 68, and 70.

Referring to FIG. 4 for the nature of the acceleration reference signal, it will be seen that the acceleration reference temperature signal is a linear function of engine inlet temperature up to 2000°F. at 60°F. inlet temperature, above which there is no increase in the acceleration reference temperature. Below 50% gas generator speed, which is idle, the acceleration reference temperature decreases with speed along the line 71 of the plot down to about 30% speed, below which the acceleration reference temperature is limited at 1650°. It is a feature of our present invention that this signal is employed for control of the turbine nozzle.

The amplified acceleration reference signal from operational amplifier 66 is mixed with a signal of gas generator speed, $N_1$, from amplifier 32, the output of which is connected through an 11 kilohm resistor 72 to a junction 74. The output terminal of amplifier 66 is connected to this junction through a 5.1 kilohm resistor 75. Junction 74 is connected to the plus input terminal at 77 of a second operational amplifier 76 through a 10 kilohm resistor 78. Resistors 72 and 75 determine the relative effect on operational amplifier 76 of the acceleration reference and gas generator speed signals. The input resistor 78 provides for limiting the potential level on the plus input of amplifier 76 by operational amplifiers 79 and 80, as will be explained.

Junction 74 is also connected through a 20 kilohm resistor 82 to the slider of a 5 kilohm potentiometer 83 connected between the regulated 10 volt supply and ground. Potentiometer 83 provides a means for calibrating the output of amplifier 76.

Operational amplifier 76 provides the nozzle reference signal on line 46 connected to the output terminal of the amplifier. The direct feedback from the output to the minus input causes operational amplifier 76 to operate as a voltage follower for isolation of line 46 from the input on the plus terminal of the amplifier. The circuits so far described, including operational amplifiers 66 and 76, provide a signal on line 46 which increases with the acceleration reference signal (which is proportional to inlet temperature up to 60°F.) and also increases with gas generator rpm. This characteristic is illustrated in the sloping characteristic lines on FIG. 5 which will be discussed below.

Operational amplifier 79 acts as a limiter responsive only to the acceleration reference signal which limits increase of the nozzle reference signal, preventing the signal from increasing above the 100% speed value if the engine should go overspeed for any reason or if the calibration of the operational amplifier 76 is erroneous. The acceleration reference signal on line 39 is supplied to the plus input of amplifier 79 through a voltage divider consisting of resistor 84 (2 kilohm) and resistor 86 (51 kilohm). The output terminal of amplifier 79 is connected through a diode 87 to the minus input of amplifier 79 and the plus input 77 of amplifier 76. Diode 87 prevents amplifier 79 from increasing the plus input to amplifier 76, but it can hold the input down in the event the potential level at junction 74 is higher than that supplied to the input of amplifier 79 through the voltage divider 84, 86. This voltage divider slightly reduces the potential at the input of amplifier 79 below that supplied to amplifier 66.

The nozzle reference temperature signal is also modified under certain conditions by a portion of the circuit which responds to engine inlet temperature and throttle position. The $T_1$ signal from amplifier 31 on line 34 is supplied through 5.1 kilohm resistor 88 to a junction 90 which is connected to the minus input of operational amplifier 80. Junction 90 also receives the nozzle reference signal from line 46 through a 7.5 kilohm resistor 91. Junction 90 is connected through a 30 kilohm resistor 92 to the minus input of an operational amplifier 94 forming part of the speed reference circuit 22. The power control input potentiometer 19 is connected between plus 10 volts and engine inlet temperature signal line 34. The movable contact, which is operated by the foot pedal, produces a signal on line 20 which is connected directly to the plus inputs of operational amplifiers 80 and 94. The output terminal of operational amplifier 80 is connected to the plus input point 77 of operational amplifier 76 through a diode 95 so that operational amplifer 80 may reduce the plus input of operational amplifier 76, but does not increase it.

Assuming that there is no effect due to current through resistor 92, the normal state of affairs at low throttle settings, it follows that the potential on the minus input of operational amplifier 80 (junction 90) equals the sum of $T_1$ times a first constant and nozzle reference signal times a second constant, the constants being dependent upon the relative values of resistors 88 and 91. As inlet temperature or the nozzle reference signal increases, the minus input of operational amplifier 80 increases. The input to the plus terminal of operational amplifier 80 is a potential equal to the inlet temperature signal potential plus theta times (10 volts minus the temperature signal). It is thus proportional to the relative movement of the power control from the idle position toward full throttle. The idle setting may be fixed by a limit on return movement of the foot pedal. Whenever the minus input to amplifier 80 becomes higher than the plus input, amplifier 80 will conduct to reduce the plus input potential of amplifier 76 and thereby the nozzle reference signal, until the nozzle reference signal is reduced sufficiently to equalize the inputs to operational amplifier 80. Thus, at closed throttle, the nozzle reference signal is controlled by inlet temperature, which limits it to a value below that which would be due to the acceleration reference and speed inputs.

Figure 5:
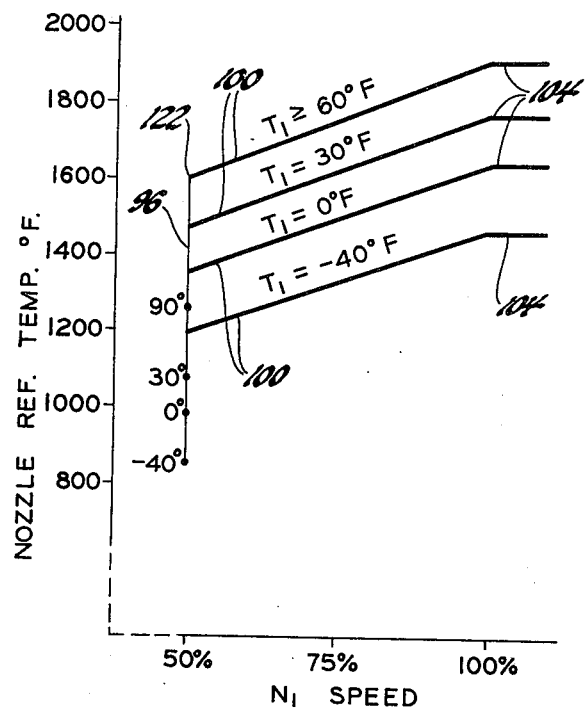
FIG. 5 is a plot illustrating variations of a nozzle reference temperature signal with gas generator speed and engine inlet temperature.
Figure 6:
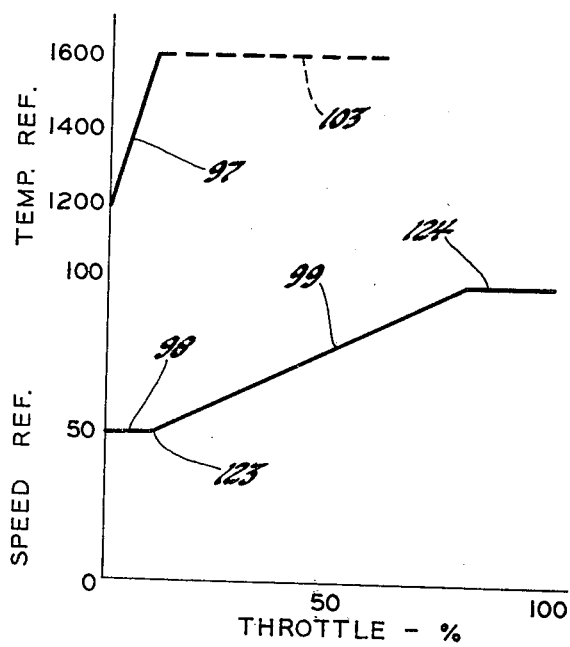
FIG. 6 is a plot illustrating variations of the nozzle reference temperature signal and a gas generator speed reference signal with variations in throttle signal.

Referring to FIGS. 5 and 6, from approximately 0 to 10% throttle, the nozzle reference temperature signal increases as indicated by vertical line 96 on FIG. 5 and line 97 on FIG. 6. The indicated points on line 96 of FIG. 5 represent closed throttle nozzle reference temperatures from about 850° to about 1350° at varying inlet temperatures at the 50% speed condition of the engine. The engine speed is maintained constant, as indicated by line 98 on FIG. 6, but fuel is increased because the nozzle opening is decreased. Thus, less of the total fuel energy is available to drive the compressor and more is available to drive the power turbine. The 10% throttle position might provide sufficient power to drive a vehicle at a constant speed of about 30 mph. Above this point, as the power control input increases, the engine gas generator speed increases along a line such as 99 in FIG. 6. This is accompanied by an increase in nozzle reference temperature due to the increase in speed along the family of lines 100 in FIG. 5. The lower lines represent $T_1$ values below 60°F. The increasing temperature and increasing speed of the gas generator result in a greater amount of energy available to the power turbine for vehicle propulsion or other purposes. The broken line 103 in FIG. 6 represents in a general way the variation of nozzle reference temperature above 10% throttle, which is not directly dependent upon throttle, but rather upon speed and acceleration reference temperature, for 60°F. inlet temperature.

Operational amplifier 80 acts as a discriminating device controlling the switch-over from constant idle speed with variable nozzle to variable speed operation at higher throttle settings.

The minimum amount of the nozzle reference signal is determined by $T_1$ when the potential increment from throttle potentiometer 19 is zero. As the throttle input increases, the output of operational amplifier 80 increases, thereby pulling the plus input to operational amplifier 76 down less and less with increasing throttle until the point is reached at which the potential at the output of operational amplifier 80 equals the potential at junction 74 less the diode drop, at which point the gas generator speed and acceleration reference signals take over control and determine the nozzle reference signal on line 46, as indicated by the lines 100 on FIG. 5.

The horizontal line segments 104 on FIG. 5 represent the maximum limit on the nozzle reference signal at the normal 100% throttle value imposed by the acceleration reference signal transmitted through amplifier 79 and diode 87 to the plus input of amplifier 76 if potential at junction 74 rises above this value.

Before proceeding with the nozzle angle control system including circuits 47, 48, and 51, it may be best to proceed with the description of the speed reference circuit 22. The output terminal of operational amplifier 94 is connected to the base of an NPN transistor 106, Delco Service type 67, the emitter of which is connected directly to the minus input of the amplifier. The collector of transistor 106 is energized from the plus 10 volt regulated source through a 10 kilohm resistor 107 and a diode 108. The collector of transistor 106 is also connected to the base of a PNP transistor 110, Delco Service type 83. The emitter of transistor 110 is energized from the plus 10 volt regulated supply through a 270 ohm resistor 111, and its collector is connected through 1 kilohm resistor 112 to the plus input of an operational amplifier 114. This operational amplifier acts as a follower and provides the speed reference signal to the fuel control 24 through line 23 which is fed back to the minus input of the operational amplifier.

The plus input of operational amplifier 114 is also connected to an operational amplifier 115 in a maximum limiting circuit and an operational amplifier 116 in a minimum setting circuit. The plus input of operational amplifier 115 is energized off a variable setting potentiometer 118 energized between the 10 volt control DC unit and ground and the plus input of operational amplifier 116 is similarly energized through a potentiometer 119. The settings of the potentiometers determine the maximum and minimum limit values of the speed reference signal. The output terminal of operational amplifier 115 is connected through diode 120 to the plus input of operational amplifier 114 and the minus input of 115. Amplifier 115 thus can pull down the potential at the plus input of operational amplifier 114 when this becomes greater than the plus input to operational amplifier 115. The output terminal of operational amplifier 116 is connected to its minus input terminal and connected through 3.3 kilohm resistor 121 to the input of operational amplifier 114.

At the point at which amplifier 80 ceases to limit the nozzle reference signal, the plus and minus inputs of this amplifier are equal. This is represented by points such as 122 on FIG. 5 where a line 100 meets line 96 and by the point 123 on FIG. 6 where increase of power control input begins to increase the speed reference signal. The inputs to operational amplifier 94 also must be equal to satisfy that amplifier, and current in resistor 92 must therefore be zero. However, if the power input signal increases; that is, the potential on line 20 increases relative to the inlet temperature signal, this unbalances the input to amplifier 94, causing it to conduct and providing the drive current in the base circuit of transistor 106. The base drive causes current to flow from the 10 volt source through resistor 107, diode 108, the collector-emitter circuit of transistor 106, and resistor 92 to junction 90. The magnitude of this current must necessarily be such as to create a drop in resistor 92 equal to the difference in potential between junction 90 and the power input on line 20 to balance the inputs to amplifier 94. Thus, the emitter current of transistor 106 is proportional to the power level input signal or theta. Diode 108 is provided to balance the emitter-base drop in transistor 110 so that the drops in resistors 107 and 111 are equal. When transistor 106 conducts, the potential drop across resistor 107 and diode 108 provide a potential causing current to flow through resistor 111 and the emitter-base circuit of transistor 110 to turn on transistor 110. The emitter current of transistor 110 will therefore be equal to the collector current of transistor 106 multiplied by the ratio of the resistances, or 10,000 divided by 270, or roughly 40 times the current through resistor 92 necessary to balance the input of operational amplifier 94. This current flows through a 1 kilohm resistor 112, which is merely a current limiting resistor, and 3.3 kilohm resistor 121 to the output of operational amplifier 116. This drives the plus input of operational amplifier 114 to a value equal to that set on the plus input of operational amplifier 116 by potentiometer 119 plus the drop in resistor 121. It thus equals the minimum setting plus a value proportional to the setting of the throttle potentiometer 19. The input follower operational amplifier 114 provides an equal signal through line 23 to the fuel control. This speed reference signal is compared in the fuel control with a gas generator speed signal from the transducer 28 and amplifier 32 to regulate fuel flow. This is the normal mode of regulation during steady state operation as distinguished from acceleration.

The speed reference signal is limited by the setting of potentiometer 118 which prevents the plus input to amplifier 114 from exceeding this input by flow through resistor 112 and diode 120 to the output terminal of amplifier 115. This provides a maximum speed reference signal which is represented by the line 124 in FIG. 6.

Getting back to the turbine nozzle control system, we start with the nozzle control circuit 47 diagrammed at the upper right of FIG. 2. The nozzle temperature reference signal on line 46 is fed through a 20 kilohm resistor 126 to the minus input of an operational amplifier 127. The plus input to this amplifier is the compensated temperature signal from the compensating circuit 26 through line 40. The output of operational amplifier 127 is connected to its minus input through a 150 kilohm resistor 128 and an 11 microfarad capacitor 130 in parallel. The ratio of resistors 128 and 126 results in a 7.5 to 1 gain in the amplifier. The capacitor provides a small amount of lag to stabilize the amplifier. The input from the compensated temperature circuit approximates actual turbine inlet temperature. As stated above, it is based upon instantaneous measured turbine inlet temperature plus compensation for thermocouple lag and modified by certain factors which cause it to represent more perfectly the anticipated performance of the engine during acceleration.

This provides the feedback to the nozzle reference temperature signal to cause the nozzle to be adjusted to the opening resulting in the desired turbine inlet temperature at the particular condition of operation. Thus, when the actual temperature signal is fed back against the desired temperature signal on line 46, the result is an output indicative of the desired change in nozzle area which is conducted through a 1 kilohm resistor 131 and 12 kilohm resistor 132 in series to the power amplifier input line 56. The power amplifier is energized from the plus 12 volt power bus and provides an output through line 59 to the servo-controlling solenoid 60. The input line to the power amplifier is also energized off the 12 volt power bus through a 160 kilohm resistor 134. The resistor 134 provides an input to the power amplifier such that there is a minimum amplifier output to provide a small current to the solenoid 60 to bias the solenoid and overcome friction or hysteresis inn the valve mechanism of the servo 12.

It will be seen, then, that the amplifier 127 causes the power amplifier to drive the servo so as to open the nozzle if turbine inlet temperature exceeds that scheduled by the reference temperature signal in line 46 and to close the nozzle if turbine inlet temperature is below that scheduled. This provides for steady-state control of the nozzle area.

Transient Nozzle Control

If there is a sharp increase in the operator's power control signal, there will be a rapid increase in turbine inlet temperature due to the increase in fuel to accelerate the gas generator. There is also an increase in the nozzle reference signal due to the increased throttle input and increasing speed. However, the temperature signal outpaces the reference signal. This simulates an indication that the engine is overtemperature because the nozzle is not open enough, so the natural result would be to open the power turbine nozzle. This is advantageous in that it increases the pressure drop across the gas generator turbine and speeds acceleration of the gas generator.

However, the desired acceleration curve of the gas generator may be to give the most acceptable acceleration of the driven vehicle rather than quickest acceleration of the gas generator turbine. When the nozzle is opened wide, the resulting lack of energy supplied to the power turbine causes a distinct lag in acceleration of the vehicle. Therefore, our system includes means including the nozzle limit logic circuit 51 and nozzle limit circuit 48 to limit the opening of the power turbine nozzle. This includes the nozzle area (or angle) feedback potentiometer 50 energized from the 10 volt circuit to ground, the follower of which is moved by the nozzle actuating mechanism. The voltage taken from the potentiometer through line 49 represents, and increases with, nozzle area. This signal is fed to the plus input of an operational amplifier 135, acting as a voltage follower with its output connected directly to the minus input. The resulting signal on the output line 136 is a direct function of nozzle angle and nozzle area. This signal is fed through 20 kilohm resistor 138 to the minus input of an operational amplifier 139, the output of which is connected through 51 kilohm resistor 140 to the minus input. The plus input of operational amplifier 139 is energized through line 52.

For the present, we may assume that the plus input line 52 of operational amplifier 139 is supplied with an adjustable fixed potential from a potentiometer 142 energized from the 10 volt supply. The nozzle limit logic circuits 51 which may vary this potential will be described below.

The ratio of resistors 140 and 138 is such that the gain of operational amplifier 139 is approximately 2½ to 1. The output of the operational amplifier is connected to the junction 143 between resistors 131 and 132 through a 620 ohm resistor 144 and a diode 146. Diode 146 allows current to flow from junction 143 to lower the input to the power amplifier and cause the nozzle to close. When the nozzle area signal fed from potentiometer 50 through amplifier 135 increases, the potential at the minus input to amplifier 139 increases. If this becomes greater than the potential on the plus input of amplifier 139, the operational amplifier draws input current through resistor 144 and diode 146 to reduce the input to power amplifier 58 and limit nozzle opening movement at the angle the potentiometer 142 is set for. Diode 146 prevents the nozzle angle feedback from overrriding the nozzle refererence temperature signal so as to increase nozzle opening.

As a result of the circuits just described, nozzle angle is limited by a fixed maximum and also by a coaction of a temperature limit a temperature feedback. In normal operation, the angle is maintained at the value to give the temperature called for by the reference temperature signal on line 46 but, upon acceleration when temperature moves up rapidly, the nozzle can open only to the angle set by potentiometer 142 in connection with the feedback potentiometer 50.

This control can be improved upon, and the means for this is the nozzle limit logic circuit 51 illustrated in the lower part of FIG. 2 which provides means for varying the limit imposed through line 52 on the nozzle opening. We should distinguish between starting conditions; that is, bringing the engine up to idle speed (50% gas generator speed in the described engine) and normal acceleration; that is, increase of power after the engine has reached idle speed and is in the operating range.

The logic circuit 51 provides an override which allows the power turbine nozzle to open to the limit set by potentiometer 142 during cranking of the gas generator. This improves starting and reduces the temperature of the exhaust gases flowing to the regenerator of the engine if one is provided. The system also includes means to sense acceleration of the engine above the idle condition, and vary the nozzle area. In a normally operating engine, the compensated turbine inlet temperature equals the acceleration reference temperature signal only during engine acceleration. During steady state operation it is limited by the nozzle temperature reference signal and is ordinarily substantially below the acceleration reference signal. Our arrangement for detecting an acceleration condition generates an acceleration signal whenever the compensated temperature comes within approximately 50° of acceleration reference temperature.

The compensated turbine inlet temperature signal is fed from the circuit 26 through line 40 and a 10 kilohm resistor 159 to the plus input of an operational amplifier 160. The acceleration reference temperature signal from the circuit 36 is supplied through line 39 and a voltage divider to the minus input of amplifier 160. The voltage divider comprises a 10 kilohm resistor 162 and a 510 kilohm resistor 163. The potential applied to the minus input of operational amplifier 160 is thus about 98% of the acceleration reference signal. When the compensated temperature signal is less than 98% of the acceleration reference signal, amplifier 160 is turned off, but when the compensated temperature signal equals or exceeds 98% of the acceleration reference signal, amplifier 160 saturates and turns on a transistor 164 (type DS-67). The transistor is turned on by base drive from the amplifier through series resistors 166 (1 kilohm), 167 (10 kilohm) and 168 (2 kilohm). Resistor 168 is connected between the base and emitter of the transistor and grounded at 170. This completes a circuit from line 52 through a variable resistor 171, the maximum value of which is 50 kilohms, and the transistor to ground. Resistor 171 and transistor 164 thus provide a shunt for the grounded end of potentiometer 142, lowering the potential on line 52 and driving the nozzle further towards closed position. The amount of nozzle shift can be set by resistor 171.

When the acceleration terminates, the nozzle control reverts to the normal steady state mode in which the area is controlled by $T_{4c}$ and the nozzle reference temperature signal through amplifier 127. During the transition from acceleration to steady state, there is a short period of time while the compensated temperature signal is dropping (as the anticipating features of the temperature compensated circuits are dying out) that $T_{4c}$ would remain greater than the nozzle reference temperature. In order to stabilize the transition between the limit and steady state nozzle control modes, the system includes an arrangement for providing a slight delay in the dropout of the acceleration override control. This is accomplished by the circuit comprising diode 172, 22 microfarad capacitor 174, and resistor 175 (20 kilohm). When the acceleration condition is sensed and amplifier 160 turns on, capacitor 174 is quickly charged through the diode 172. At the end of the acceleration condition the charge on capacitor 174 keeps transistor 164 turned on momentarily until the charge on the condenser decays through the series circuit of resistors 175 and 168.

During starting; that is, during acceleration from lightoff to idle gas generator speed, it is not desired to have the nozzle closed; there is no need for output from the power turbine, and it is desirable to make as much energy available as possible to the gas generator turbine. It is possible to use various means, including a speed-responsive switch, to sense the reaching of idle speed by the gas generator. In this particular case, the starter is deenergized at about 43% gas generator speed, which is near enough for our purposes. Operational amplifier 160 is overridden during operation of starter 54 by the circuit to be described. The circuit from 10 volt supply through series resistors 178 and 179 (both 10 kilohm) and a diode 180 leads to a point which is maintained at a low potential during operation of the starter. It may, for example, be a switch closed during operation of the starter or at low gas generator speed. As illustrated schematically, it is switch 182 closed when the starter is energized. Obviously, switch 182 could be speed-responsive and remain closed below idle speed.

When the switch 182 is closed or the potential at that point is otherwise lowered to a sufficient extent, a transistor 183 (type DS-83) is turned on. This establishes a current flow from plus 10 volts through resistors 184 (10 kilohm) and 186 (2 kilohm) in series to ground. This turns on a second trasistor 187 (DS-67) the collector of which is connected to the base of transistor 164, the emitter of which is grounded, and the base of which is connected between resistors 184 and 186. This shunts resistor 168 and the emitter-base circuit of transistor 164 and turns it off, assuming it would otherwise be on. Thus, regardless of the operation of operational amplifier 160 in response to corrected turbine inlet temperature and acceleration reference temperature, the nozzle signal is not held down and the nozzle remains open during cranking.

Figure 7:
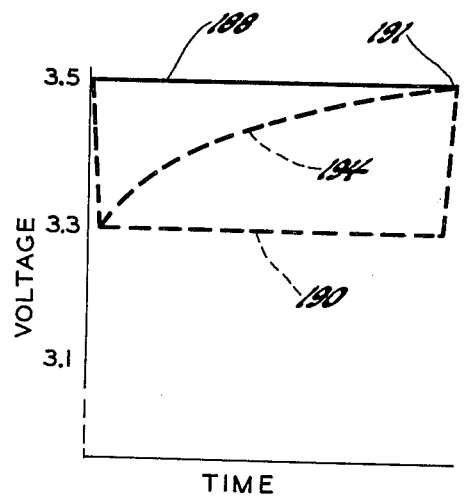
FIG. 7 is a plot illustrating variations of the nozzle reference temperature signal with time during gas generator acceleration with various modes of control.

This action may be explained further by reference to FIG. 7, in which the line 188 at 3.5 volts represents the open nozzle position signal to the power amplifier 58 when transistor 164 is turned off. This is the condition during cranking.

The broken line 190 which starts at 3.5 volts, decreases rapidly to 3.3 volts, remains constant until the termination of acceleration, and then rises to the normal value at point 191, represents the effect of the acceleration circuit embodying operational amplifier 160. Thus, in case of gas generator acceleration, the operational amplifier 160 provides a signal which causes the nozzle to close and thereby increase the amount of energy available from the power turbine as the vehicle is being accelerated.

FIG. 3 illustrates a modification of the circuit of FIG. 2 which provides a different characteristic of turbine nozzle area during engine acceleration. The difference involved in FIG. 3 is the insertion of a capacitor 192 (20 microfarad) paralleled by a resistor 193 (300 kilohm) in the circuit between the collector of transistor 164 and the variable resistor 171. In this case, when the compensated temperature signal reaches the value which indicates acceleration of the gas generator, the potential applied to the power amplifier is reduced as with the circuit of FIG. 2. However, as the 20 microfarad capacitor 192 is charged, the droop in potential decays exponentially and the potential applied to the power amplifier rises along the exponential curve 194 in FIG. 7 after the initial drop.

The resistor 193 provides for bleed down of capacitor 192 in case of rapidly succeeding accelerations of the gas generator.

With the characteristic of curve 194, the initial closing of the nozzle as acceleration is initiated provides an increment of energy to the power turbine. The subsequent opening redistributes the energy available so that the energy available to accelerate the gas generator is increased while the portion of the available energy supplied to the power turbine decreases. However, the total energy supplied to the power turbine will increase because of the greater temperature and rate of flow through the engine.

If it is desired to have some other characteristic for the line 194 than the simple exponential curve illustrated, other types of circuits can be employed to vary the flow of current through resistor 171 as a function of time after the beginning of acceleration.

Annotations

We believe that the foregoing detailed description is amply sufficient 3,821,562. practice of our claimed invention by those skilled in the art to which it pertains. However, it may be desirable to refer to certain U.S.

patent applications, of common ownership with this application, which describe in detail circuits or subsystems which may be employed as part of the overall engine control diagrammed in FIG. 1. Reference to the applications may be made if necessary to facilitate understanding of the system described and claimed here and the best mode contemplated by us of implementing our invention. The thermocouple amplifier 33 may be as described in Ser. No. 381,055 of Davis, Lopke, and Pechous, filed July 20, 1973, U.S. Pat. No. 3,821562. The fuel control 24 may include an amplifier as described in Ser. No. 385,952 of Davis and Lopke, filed Aug. 6, 1973, U.S. Pat. No. 3,852,957. The nozzle power amplifier 58 may embody similar electronic technology. The acceleration reference temperature signal generating circuit 36 may be as described in Ser. No. 343,295 of Oppmann, filed Mar. 21, 1973, U.S. Pat. No. 3,834,158, but we prefer that it be as described in Ser. No. 392,738 of Davis, Lopke, and Pechous, filed Aug. 29, 1973, U.S. Pat. No. 3,851,464. The temperature compensating circuit 26 may be as described in Ser. No. 392,739 of Davis, Lopke, and Pechous, filed Aug. 29, 1973.

Turbine motive fluid temperature is measured in our system preferably at the inlet to the turbine. However, it is known in gas turbine controls to use instead turbine discharge temperature, which varies rather closely with turbine inlet temperature, and this temperature may be regarded as the motive fluid temperature for control purposes. Likewise, it is possible in some cases to use ambient air temperature for engine inlet temperature.

The preferred turbine nozzle structures for gas turbine engines, so far as we are aware, ordinarily involve a nozzle with variable setting angle vanes in which varying the setting changes both the angle of discharge of motive fluid from the turbine nozzle and the area of the turbine nozzle. There are disclosures of turbine nozzles which have variable area but not variable angle; and it might conceivably be desirable in some installations to have a nozzle of variable angle but not variable area. Reference in the appended claims to a variable turbine nozzle is intended to include nozzles in which the angle of discharge, the area of the nozzle, or both, are variable.

We believe it will be clear to those skilled in the art from the foregoing detailed description that we have provided improvements in controls for gas turbine engines, particularly in the control of variable turbine nozzles for gascoupled turbine engines; and that the system as disclosed herein is particularly well suited to the requirements of practice.

The detailed description of the preferred embodiment of the invention for the purpose of explaining the principles thereof is not to be considered as limiting or restricting the invention, since many modifications may be made by the exercise of skill in the art.

We claim:

1. A system for control of a variable area power turbine nozzle of a gas-coupled gas turbine engine including a gas generator and a power turbine, the system including means responsive to a variable temperature reference signal and to turbine motive fluid temperature normally operative to vary the nozzle area to control turbine motive fluid temperature by opening the nozzle in response to excess of motive fluid temperature over the temperature reference signal; the system including means for generating a signal of a first upper limit to nozzle area at the initiation of gas generator acceleration in the normal operating speed range of the gas generator and means for generating a signal of a second upper limit to nozzle area larger than the first limit during gas generator acceleration below the normal operating speed range of the gas generator, the limit signal generating means being coupled to the means to vary the nozzle area so as to limit increase in opening of the nozzle in response to the temperature reference signal and the motive fluid temperature.

2. A system for control of a variable area power turbine nozzle of a gas-coupled gas turbine engine including a gas generator and a power turbine, the system including means responsive to a variable temperature reference signal and to turbine motive fluid temperature normally operative to vary the nozzle area to control turbine motive fluid temperature by opening the nozzle in response to excess of motive fluid temperature over the temperature reference signal; the system including means responsive to a turbine motive fluid acceleration reference temperature signal and to a signal representative of actual turbine motive fluid temperature for generating a signal of a first upper limit to nozzle area at the initiation of gas generator acceleration in the normal operating speed range of the gas generator and means for generating a signal of a second upper limit to nozzle area larger than the first limit during gas generator acceleration below the normal operating speed range of the gas generator, the limit signal generating means being coupled to the means to vary the nozzle area so as to limit increase in opening of the nozzle in response to the temperature reference signal and the motive fluid temperature.

3. A system for control of a variable area power turbine nozzle of a gas-coupled gas turbine engine including a gas generator and a power turbine, the system including means responsive to a variable temperature reference signal and to turbine motive fluid temperature normally operative to vary the nozzle area to control turbine motive fluid temperature by opening the nozzle in response to excess of motive fluid temperature over the temperature reference signal; the system including means for generating a signal of a first upper limit to nozzle area at the initiation of gas generator acceleration in the normal operating speed range of the gas generator and means for generating a signal of a second upper limit to nozzle area larger than the first limit during gas generator acceleration below the normal operating speed range of the gas generator, the limit signal generating means being coupled to the means to vary the nozzle area so as to limit increase in opening of the nozzle in response to the temperature reference signal and the motive fluid temperature; and timing means operative to cause the nozzle area to close to the first limit and then progressively open to the second limit during acceleration in the said normal operating speed range.

4. A system for control of a variable area power turbine nozzle of a gas-coupled gas turbine engine including a gas generator and a power turbine, the system comprising means for generating a nozzle reference temperature signal, means for generating a turbine motive fluid temperature signal, and control means responsive to the said signals effective normally to vary the nozzle area so as to cause the motive fluid temperature to follow the reference temperature, the system including means for generating a signal indicative of the nozzle area, means for generating a nozzle area limit signal, and means responsive to the two last-named signals effective to limit increasing variation of the nozzle area by the said control means, the system being characterized by first means for generating the area limit signal including settable means providing a first area limit, means for detecting acceleration of the gas generator effective to override the said first means and provide a second area limit smaller than the first area limit during such acceleration, and means effective during starting of the gas generator operative to override the acceleration-detecting means so as to maintain the first area limit.

5. A system for control of a variable area power turbine nozzle of a gas-coupled gas turbine engine including a gas generator and a power turbine, the system comprising means for generating a nozzle reference temperature signal, means for generating a turbine motive fluid temperature signal, and control means responsive to the said signals effective normally to vary the nozzle area so as to cause the motive fluid temperature to follow the reference temperature, the system including means for generating a signal indicative of the nozzle area, means for generating a nozzle area limit signal, and means responsive to the two last-named signals effective to limit increasing variation of the nozzle area by the said control means, the system being characterized by first means responsive to a turbine motive fluid acceleration reference temperature signal and to a signal representative of actual turbine motive fluid temperature for generating the area limit signal including settable means providing a first area limit, means for detecting acceleration of the gas generator effective to override the said first means and provide a second area limit smaller than the first area limit during such acceleration, and means effective during starting of the gas generator operative to override the acceleration-detecting means so as to maintain the first limit.

6. A system for control of a variable area power turbine nozzle of a gas-coupled gas turbine engine including a gas generator and a power turbine, the system comprising means for generating a nozzle reference temperature signal, means for generating a turbine motive fluid temperature signal, and control means responsive to the said signals effective normally to vary the nozzle area so as to cause the motive fluid temperature to follow the reference temperature, the system including means for generating a signal indicative of the nozzle area, means for generating a nozzle area limit signal, and means responsive to the two last-named signals effective to limit increasing variation of the nozzle area by the said control means, the system being characterized by first means for generating the area limit signal including settable means providing a first area limit, means for detecting acceleration of the gas generator effective to override the said first means and provide a second area limit smaller than the first area limit during such acceleration, and means effective during starting of the gas generator operative to override the acceleration-detecting means so as to maintain the first area limit; and further characterized by means for effecting decay of the second area limit toward the first area limit after initial establishment of the second limit during such acceleration.

7. A system for control of a variable area power turbine nozzle of a gas-coupled gas turbine engine including a gas generator and a power turbine, the system comprising means for generating a nozzle reference temperature signal, means for generating a turbine motive fluid temperature signal, and control means responsive to the said signals effective normally to vary the nozzle area so as to cause the motive fluid temperature to follow the reference temperature, the system including means for generating a signal indicative of the nozzle area, means for generating a nozzle area limit signal, and means responsive to the two last-named signals effective to limit increasing variation of the nozzle area by the said control means, the system being characterized by first means responsive to a turbine motive fluid acceleration reference temperature signal and to a signal representative of actual turbine motive fluid temperature for generating the area limit signal including settable means providing a first area limit, means for detecting acceleration of the gas generator effective too override the said first means and provide a second area limit smaller than the first area limit during such acceleration, and means effective during starting of the gas generator operative to override the acceleration-detecting means so as to maintain the first area limit; and further characterized by means for effecting decay of the second area limit toward the first area limit after initial establishment of the second area limit during such acceleration.

* * * * *